United States Patent
Honma et al.

(10) Patent No.: US 10,374,229 B2
(45) Date of Patent: Aug. 6, 2019

(54) POSITIVE ELECTRODE ACTIVE MATERIAL FOR ALKALI-ION SECONDARY BATTERIES

(71) Applicants: NATIONAL UNIVERSITY CORPORATION NAGAOKA UNIVERSITY OF TECHNOLOGY, Niigata (JP); NIPPON ELECTRIC GLASS CO., LTD., Shiga (JP)

(72) Inventors: Tsuyoshi Honma, Niigata (JP); Takayuki Komatsu, Niigata (JP); Satoshi Nakata, Niigata (JP); Hideo Yamauchi, Shiga (JP); Fumio Sato, Shiga (JP)

(73) Assignees: NATIONAL UNIVERSITY CORPORATION NAGAOKA UNIVERSITY OF TECHNOLOGY, Niigata (JP); NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/553,359

(22) PCT Filed: Feb. 17, 2016

(86) PCT No.: PCT/JP2016/054557
§ 371 (c)(1),
(2) Date: Aug. 24, 2017

(87) PCT Pub. No.: WO2016/136555
PCT Pub. Date: Sep. 1, 2016

(65) Prior Publication Data
US 2018/0138505 A1 May 17, 2018

(30) Foreign Application Priority Data

Feb. 25, 2015 (JP) .................. 2015-035544
Sep. 28, 2015 (JP) .................. 2015-189422

(51) Int. Cl.
| | | |
|---|---|---|
| *H01M 4/38* | (2006.01) | |
| *H01M 4/131* | (2010.01) | |
| *H01M 4/36* | (2006.01) | |
| *H01M 4/485* | (2010.01) | |
| *H01M 4/505* | (2010.01) | |
| *H01M 4/525* | (2010.01) | |
| *H01M 4/02* | (2006.01) | |
| *H01M 10/0525* | (2010.01) | |
| *H01M 10/48* | (2006.01) | |

(52) U.S. Cl.
CPC .......... *H01M 4/381* (2013.01); *H01M 4/131* (2013.01); *H01M 4/364* (2013.01); *H01M 4/485* (2013.01); *H01M 4/505* (2013.01); *H01M 4/525* (2013.01); *H01M 10/0525* (2013.01); *H01M 10/48* (2013.01); *H01M 2004/028* (2013.01)

(58) Field of Classification Search
CPC ........ H01M 4/38; H01M 4/381; H01M 4/131; H01M 4/36; H01M 4/364
See application file for complete search history.

(56) References Cited

U.S. PATENT DOCUMENTS

2010/0183923 A1* 7/2010 Okada .................. C03C 3/14
429/221
2015/0303470 A1* 10/2015 Honma ................ H01M 4/5825
429/221

FOREIGN PATENT DOCUMENTS

| JP | 2008-251481 A | 10/2008 |
|---|---|---|
| JP | 2011-14373 A | 1/2011 |
| JP | 2014-96289 A | 5/2014 |
| JP | 2016-46138 A | 4/2016 |

OTHER PUBLICATIONS

P. Barpanda et al., Solid State Ionics (2014), http://dx.doi.org/10.1016/j.ssi.2014.03.011) (7 pages).

* cited by examiner

*Primary Examiner* — Karie O'Neill Apicella
(74) *Attorney, Agent, or Firm* — Muncy, Geissler, Olds & Lowe, P.C.

(57) ABSTRACT

A positive electrode active material for alkali-ion secondary batteries is provided which contains 20-55% of $Na_2O+Li_2O$, 10-60% of $CrO+FeO+MnO+CoO+NiO$, and 20-55% of $P_2O_5+SiO_2+B_2O_3$ in terms of oxide-equivalent mol % and includes 50 mass % or more of an amorphous phase. According to the present invention, it is possible to provide a positive electrode active material for alkali-ion secondary batteries that enables high energy density and is excellent in the charge and discharge characteristics.

2 Claims, No Drawings

POSITIVE ELECTRODE ACTIVE MATERIAL FOR ALKALI-ION SECONDARY BATTERIES

TECHNICAL FIELD

The present invention relates to a positive electrode active material used as an electrode material of an alkali-ion secondary battery, such as a sodium-ion secondary battery.

BACKGROUND ART

In recent years, lithium-ion secondary batteries have established their status as high capacity and lightweight power sources that are indispensable to portable electronic terminals, electric vehicles, etc. On the other hand, sodium-ion secondary batteries using sodium as substitute for lithium are also studied because there is concern of the global escalating cost of raw materials for lithium used in lithium-ion secondary batteries.

To achieve high energy density, alkali-ion secondary batteries are required to have higher voltage or higher capacity. However, the reference redox potential of sodium ions is higher than that of lithium ions by 0.3 V. When alkali ions of the positive electrode active material are changed from lithium to sodium, therefore, the operating potential decreases. Thus, in order to achieve high energy density comparable with that of lithium ion secondary batteries, needs for high voltage or high capacity are relatively high in sodium-ion secondary batteries. For example, Non-Patent Document 1 discloses a positive electrode active material composed of $Na_2(Fe_{1-y}Mn_y)P_2O_7$ ($0 \leq y \leq 1$).

PRIOR ART DOCUMENT

Non-Patent Document

[Non-Patent Document 1] Prabeer Barpanda et al., Solid State Ionics, 2014 (DOI: 10.1016/j.ssi.2014.03.011)

SUMMARY OF INVENTION

Problems to be Solved by Invention

The positive electrode active material composed of $Na_2(Fe_{1-y}Mn_y)P_2O_7$ described in Non-Patent Document 1 is reported to cause rapid capacity deterioration as the content of Mn is increased to achieve higher voltage. A problem is therefore that the above active material does not have charge and discharge characteristics that can satisfy actual specifications because it is difficult to achieve both the high voltage and high capacity and the energy density is low.

In consideration of the above, an object of the present invention is to provide a positive electrode active material for alkali-ion secondary batteries that enables high energy density and is excellent in the charge and discharge characteristics.

Means for Solving Problems

The positive electrode active material for alkali-ion secondary batteries of the present invention contains 20-55% of $Na_2O+Li_2O$, 10-60% of $CrO+FeO+MnO+CoO+NiO$, and 20-55% of $P_2O_5+SiO_2+B_2O_3$ in terms of oxide-equivalent mol % and includes 50 mass % or more of an amorphous phase. In the present description, "XX+YY+ . . . " means the total amount of contents of respective components.

The positive electrode active material for alkali-ion secondary batteries of the present invention (also simply referred to as a "positive electrode active material," hereinafter) includes 50 mass % or more of an amorphous phase. Owing to this feature, the diffusivity of alkali ions (such as sodium ions and lithium ions) is excellent. As a result, insertion and extraction of alkali ions due to charge and discharge can readily take place and it is therefore possible to increase the capacity. Moreover, the degree of freedom of composition design is higher as compared with a positive electrode active material composed of crystals and it is thus easy to advantageously achieve the high voltage and high capacity.

In a preferred embodiment, the positive electrode active material for alkali-ion secondary batteries of the present invention may contain 20-55% of $Na_2O+Li_2O$, 10-60% of $FeO+MnO+NiO$, and 20-55% of $P_2O_5$ in terms of oxide-equivalent mol %.

In a preferred embodiment, the positive electrode active material for alkali-ion secondary batteries of the present invention may contain 20-55% of $Na_2O+Li_2O$, 10-60% of FeO, and 20-55% of $P_2O_5$ in terms of oxide-equivalent mol %.

In an embodiment, the positive electrode active material for alkali-ion secondary batteries of the present invention can be a positive electrode active material for sodium-ion secondary batteries that contains 20-55% of $Na_2O$, 10-60% of $CrO+FeO+MnO+CoO+NiO$, and 20-55% of $P_2O_5+SiO_2+B_2O_3$ in terms of oxide-equivalent mol %.

In an alternative embodiment, the positive electrode active material for alkali-ion secondary batteries of the present invention can be a positive electrode active material for lithium-ion secondary batteries that contains 20-55% of $Li_2O$, 10-60% of $CrO+FeO+MnO+CoO+NiO$, and 20-55% of $P_2O_5+SiO_2+B_2O_3$ in terms of oxide-equivalent mol %.

Effect of Invention

According to the present invention, it is possible to provide a positive electrode active material for alkali-ion secondary batteries that enables high energy density and is excellent in the charge and discharge characteristics.

MODE(S) FOR CARRYING OUT THE INVENTION

The positive electrode active material for alkali-ion secondary batteries of the present invention may contain 20-55% of $Na_2O+Li_2O$, 10-60% of $CrO+FeO+MnO+CoO+NiO$, and 20-55% of $P_2O_5+SiO_2+B_2O_3$ in terms of oxide-equivalent mol %. The reason that the composition is limited as the above will be described below. Unless otherwise stated, "%" means "mol %" in the following description for the content of each composition.

$Na_2O$ and $Li_2O$ serve as supply sources for alkali ions that move between a positive electrode active material and a negative electrode active material during the charge and discharge. The content of $Na_2O+Li_2O$ may be 20-55%, preferably 23-52%, and particularly preferably 25-40%. If the content of $Na_2O+Li_2O$ is unduly low, the amount of alkali ions involved in the insertion and extraction will be small and the charge/discharge capacity may tend to deteriorate. If the content of $Na_2O+Li_2O$ is unduly high, other crystals that are not involved in the charge and discharge, such as $Na_3PO_4$ and $Li_3PO_4$, will readily precipitate and the charge/discharge capacity may tend to deteriorate. When the positive electrode active material for alkali-ion secondary batteries contains $Na_2O$, $CrO+FeO+MnO+CoO+NiO$, and $P_2O_5+SiO_2+B_2O_3$, the content of $Na_2O$ may be 20-55%, preferably 23-52%, and particularly preferably 25-40%.

CrO, FeO, MnO, CoO, and NiO, which are transition metal oxides, serve to increase the redox potential of the positive electrode active material by changing the valence during the charge and discharge. Among these, MnO and NiO are highly effective in increasing the redox potential. In addition to the above, FeO further has an effect of stabilizing the structure of a positive electrode active material during the charge and discharge to improve the cycle characteristics. It is therefore preferred to appropriately select a transition metal oxide and, in some cases, mix transition metal oxides for use in accordance with desired characteristics.

Cr, Fe, Mn, Co, and Ni may be preferably low valent and particularly preferably divalent. When alkali ions are extracted from the positive electrode active material due to the initial charge, an oxidation reaction of transition metal ions (e.g. $Fe^{2+} \rightarrow Fe^{3+}$) progresses for charge compensation. As the ratio of low-valent (in particular divalent) transition metal ions that contribute to the charge compensation increases, the amount of alkali ions extracted from the positive electrode active material increases, and a high charge/discharge capacity may be readily exhibited.

The content of $CrO+FeO+MnO+CoO+NiO$ may be 10-60%, preferably 15-55%, and particularly preferably 30-50%. If the content of $CrO+FeO+MnO+CoO+NiO$ is unduly low, the amount of alkali ions involved in the insertion and extraction will be small because the amount of transition metal elements generating a redox reaction decreases, and the charge/discharge capacity may tend to deteriorate. If the content of $CrO+FeO+MnO+CoO+NiO$ is unduly high, other crystals that are not involved in the charge and discharge, such as $NaFePO_4$ and $Li_3PO_4$, will readily precipitate and the charge/discharge capacity may tend to deteriorate. The content of $FeO+MnO+NiO$ may be 10-60%, preferably 15-55%, and particularly preferably 30-50%. The content of each of CrO, FeO, MnO, CoO, and NiO may be preferably 0-60% in an embodiment, 10-60% in another embodiment, 15-55% in still another embodiment, and particularly preferably 30-50%. In the present invention, the content of transition metal oxides (such as $Cr_2O_3$, $Fe_2O_3$, and $MnO_2$) other than divalent oxides is represented in terms of divalent transition metal oxide-equivalent.

$P_2O_5$, $SiO_2$, and $B_2O_3$ are each a component that forms a three-dimensional network structure to stabilize the structure of a positive electrode active material. Containing such components allows an amorphous phase to be readily formed to improve the alkali-ion conductivity. In particular, $P_2O_5$ is preferred because of excellent alkali-ion conductivity. The content of $P_2O_5+SiO_2+B_2O_3$ may be 20-55%, preferably 23-52%, and particularly preferably 25-40%. If the content of $P_2O_5+SiO_2+B_2O_3$ is unduly low, the above effects will not be readily obtained. If the content of $P_2O_5+SiO_2+B_2O_3$ is unduly high, other crystals that are not involved in the charge and discharge, such as $P_2O_5$, will readily precipitate and the charge/discharge capacity may tend to deteriorate. The content of each of $P_2O_5$, $SiO_2$, and $B_2O_3$ may be preferably 0-55% in an embodiment, 20-55% in another embodiment, 23-52% in still another embodiment, and particularly preferably 25-40%.

The content of an amorphous phase in the positive electrode active material may be 50% or more and may be preferably 70% or more in an embodiment, 80% or more in another embodiment, 85% or more in still another embodiment, 95% or more in yet another embodiment, and particularly preferably 100%, in terms of mass %. If the content of the amorphous phase is unduly low, the alkali-ion conductivity will readily deteriorate, and the charge and discharge characteristics (in particular, high-speed charge and discharge characteristics) and cycle characteristics may readily deteriorate. The positive electrode active material of the present invention may be manufactured using a method (melting and rapid-quenching method) to be described later and, in this case, a desired content of amorphous phase can be readily achieved.

The content of an amorphous phase in the positive electrode active material may be obtained by peak separation into crystalline diffraction lines and an amorphous halo in a diffraction profile within a range of 10-60° of 2θ value. The diffraction profile is obtained through powder X-ray diffraction measurement using CuKα rays. Specifically, a content Xg of the amorphous phase can be obtained from the following equation:

$$Xg = [1 - \{Ic/(Ic+Ia)\}] \times 100 \text{ (mass \%)}$$

where Ia represents integrated intensity obtained by peak separation of a broad diffraction line (amorphous halo) within a range of 10-45° from a total scattering curve that is obtained by subtracting the background from the diffraction profile, and Ic represents the total sum of integrated intensity obtained by peak separation of crystalline diffraction lines, which are originated from crystals and detected within a range of 10-60°, from the total scattering curve.

The form of the positive electrode active material may preferably be, but is not limited to being, in a powdered state. Such a powdered state allows the specific surface area to be large to increase sites for insertion and extraction of alkali ions and, therefore, the charge/discharge capacity can be readily improved. The average particle diameter of the positive electrode active material may be preferably 0.1-20 μm in an embodiment, 0.3-15 μm in another embodiment, 0.5-10 μm in still another embodiment, and particularly preferably 0.6-5 μm. The maximum particle diameter may be preferably 150 μm or less in an embodiment, 100 μm or less in another embodiment, 75 μm or less in still another embodiment, and particularly preferably 55 μm or less. If the average particle diameter or the maximum particle diameter is unduly large, the insertion and extraction of alkali ions will be less likely to take place during the charge and discharge and the charge/discharge capacity may therefore tend to deteriorate. If the average particle diameter is unduly small, the powder will be in a poor dispersed state when made into paste and the production of a uniform electrode may tend to be difficult.

As used herein, the average particle diameter and the maximum particle diameter refer to values of a median diameter D50 (50% volume cumulative diameter) and a median diameter D99 (99% volume cumulative diameter), respectively, of the primary particles. These values can be measured using a laser diffraction-type particle size distribution meter.

Next, a method of manufacturing the positive electrode active material of the present invention will be described. First, a raw material batch is obtained by preparing raw material powders to have the above composition. Then, the obtained raw material batch is melted. The melting temperature may be appropriately adjusted so that the raw material batch is sufficiently melted into a homogeneous molten material. Specifically, the melting temperature may be preferably 800° C. or higher and particularly preferably 900° C. or higher. The upper limit of the melting temperature is not particularly limited, but may be preferably 1,500° C. or lower and particularly preferably 1,400° C. or lower because unduly high melting temperature will lead to energy loss and/or evaporation of alkali components.

A raw material that contains divalent Fe element has a tendency that the divalent Fe is oxidized to trivalent Fe when the raw material is melted in the air. For example, when FeO is used as a raw material, FeO is likely to change into $Fe_2O_3$ when the raw material is melted in the air. As the ratio of trivalent Fe ions increases in the positive electrode active material, divalent Fe ions that contribute to the charge compensation may decrease to readily deteriorate the initial charge/discharge capacity. To overcome this, the melting can be performed in a reductive atmosphere or inert atmosphere thereby to suppress oxidization of Fe ions during the melting and it is thus possible to obtain a positive electrode active material that is excellent in the initial charge and discharge characteristics.

For the melting in a reductive atmosphere, it is preferred to supply a reductive gas into the melting bath. It is preferred to use, as the reductive gas, a mixture gas of 90-99.5% of $N_2$ and 0.5-10% of $H_2$, in particular a mixture gas of 92-99% of $N_2$ and 1-8% of $H_2$, in terms of vol %.

For the melting in an inert atmosphere, it is preferred to supply an inert gas into the melting bath. It is preferred to use any of nitrogen, argon, and helium as the inert gas.

The reductive gas or the inert gas may be supplied into an atmosphere above the molten material in the melting bath or supplied directly into the molten material from a bubbling nozzle, or both the schemes may be performed concurrently.

By using one or more composite oxides as the raw material powders, it is possible to increase the ratio of an amorphous phase. In addition, a positive electrode active material excellent in the homogeneity can be readily obtained and it is easy to stabilize the charge/discharge capacity of an alkali-ion secondary battery that uses the positive electrode active material. Examples of such composite oxides include sodium metaphosphate ($NaPO_3$), sodium tertiary phosphate ($Na_3PO_4$), lithium metaphosphate ($LiPO_3$), and lithium tertiary phosphate ($Li_3PO_4$).

Subsequently, the obtained molten material is cooled to be solidified (into a melt-solidified material) and a positive electrode active material that contains an amorphous phase is thereby obtained. The method of forming the melt-solidified material is not particularly limited. For example, the molten material may be flowed into between a pair of cooling rolls to form a film-like material while rapidly cooling it, or the molten material may be cast into a mold to form an ingot-like material.

When the above melt-solidified material contains trivalent Fe ions, it is preferred to reduce the trivalent Fe ions to divalent Fe ions. Examples of the method of reducing Fe ions include burning in a reductive atmosphere. The reductive atmosphere may preferably contain at least one type of reductive gas selected from $H_2$, $NH_3$, CO, $H_2S$, and $SiH_4$, particularly preferably contain at least one type selected from $H_2$, $NH_3$, and CO, and further preferably contain $H_2$ gas in the atmosphere. When $H_2$ gas is used, it is preferred to mix an inert gas such as $N_2$ in the gas in order to reduce the risk, such as explosion, during the burning. Specifically, the reductive gas may preferably contain 90-99.9% of $N_2$ and 0.1-10% of $H_2$ in an embodiment or 90-99.5% of $N_2$ and 0.5-10% of $H_2$ in another embodiment and particularly preferably contain 92-99% of $N_2$ and 1-4% of $H_2$, in terms of vol %.

The burning temperature (maximum temperature) may preferably be not lower than the glass transition temperature of the melt-solidified material and not higher than the crystallization temperature. Specifically, the burning temperature may be preferably within a range of 350-610° C. in an embodiment, 400-600° C. in another embodiment, and 420-550° C. in still another embodiment, and particularly preferably within a range of 425-450° C. If the burning temperature is unduly low, trivalent Fe ions in the melt-solidified material are less likely to be reduced to divalent Fe ions. If the burning temperature is unduly high, crystals will precipitate from the melt-solidified material to readily reduce the ratio of an amorphous phase in the obtained positive electrode active material.

The holding time for the maximum temperature during the burning may be preferably 10 minutes or longer and particularly preferably 30 minutes or longer. If the holding time is unduly short, the given heat energy will be insufficient to reduce trivalent Fe ions in the melt-solidified material to divalent Fe ions. On the other hand, the upper limit is not particularly limited, but when the melt-solidified material is in a powdered state, unduly long holding time may cause excessive fusion of the powder and the charge/discharge capacity of the obtained positive electrode active material will readily deteriorate.

The burning can be performed using an electrically-heating furnace, rotary kiln, microwave heating furnace, high-frequency heating furnace, etc.

The melt-solidified material and conductive carbon may be mixed while being pulverized and, in this case, the obtained positive electrode active material can have conductivity. In addition, trivalent Fe ions in the melt-solidified material can be efficiently reduced to divalent Fe ions and a positive electrode active material can be readily obtained which has high charge/discharge capacity and good cycle characteristics. Examples of carbon sources to be used include highly-conductive carbon black such as acetylene black and Ketjen black, carbon powder such as graphite, and carbon fibers. Among these, acetylene black is preferred because of the high electron conductivity. The mixing ratio of the melt-solidified material and the conductive carbon may be preferably 80-99.5% of the melt-solidified material versus 0.5-20% of the conductive carbon and particularly preferably 85-98% of the melt-solidified material versus 2-15% of the conductive carbon in terms of mass %. When the mixing ratio of the melt-solidified material and the conductive carbon falls within the above range, effects of improving the charge/discharge capacity and cycle characteristics can be readily obtained.

Examples of the method of mixing the melt-solidified material and conductive carbon while pulverizing them include a method of using a commonly-used pulverizer, such as a mortar, stone mill, ball mill, attritor, vibrating ball mill, satellite ball mill, planetary ball mill, jet mill, and bead mill. Among these, the planetary ball mill may be preferably used. The planetary ball mill is configured such that a bedplate is rotated around its axis while mill pots are rotated around their axes, and can efficiently generate considerably high impact energy. Thus, the planetary ball mill not only allows the conductive carbon to be homogeneously dispersed in the melt-solidified material, but also allows an amorphous phase to be readily formed in the melt-solidified material.

The positive electrode active material of the present invention can be used for an alkali-ion secondary battery (such as a sodium-ion secondary battery and lithium-ion secondary battery) that uses an electrolyte, such as an aqueous solvent, nonaqueous solvent, and ionic liquid. The positive electrode active material can also be used for an all-solid alkali-ion secondary battery (such as an all-solid sodium-ion secondary battery and all-solid lithium-ion secondary battery) that uses a solid electrolyte.

EXAMPLES

Hereinafter, the present invention will be described in detail with reference to examples. The present invention is not limited to the following examples.

Tables 1 and 2 list Examples 1 to 8 and Comparative Examples 1 to 3.

TABLE 1

|  |  | Examples | | | | | Comparative Examples | |
|---|---|---|---|---|---|---|---|---|
|  |  | 1 | 2 | 3 | 4 | 5 | 1 | 2 |
| Composition (mol %) | $Na_2O$ | 33.3 | 30 | 27.5 | 25 | 33.3 | 33.3 | 33.3 |
|  | FeO | 33.3 | 40 | 45 | 50 |  | 33.3 |  |
|  | MnO |  |  |  |  | 33.3 |  | 33.3 |
|  | $P_2O_5$ | 33.3 | 30 | 27.5 | 25 | 33.3 | 33.3 | 33.3 |
| Amorphous phase (mass %) |  | 100 | 100 | 100 | 100 | 100 | 2 | 1 |
| Type of precipitated crystal |  | — | — | — | — | — | $Na_2FeP_2O_7$ | $Na_2MnP_2O_7$ |
| Discharge capacity (mAh/g) |  | 103 | 112 | 118 | 124 | 90 | 89 | 16 |
| Average discharge voltage (V) |  | 2.5 | 2.48 | 2.48 | 2.45 | 3.5 | 2.81 | 2.8 |
| Energy density (Wh/kg) |  | 258 | 278 | 293 | 304 | 315 | 250 | 45 |

TABLE 2

|  |  | Examples | | | Comparative Example |
|---|---|---|---|---|---|
|  |  | 6 | 7 | 8 | 3 |
| Composition (mol %) | $Na_2O$ | 30 | 25 | 33.3 | 25 |
|  | FeO |  |  |  |  |
|  | MnO | 25 | 50 | 33.3 | 50 |
|  | $P_2O_5$ | 45 | 25 | 33.3 | 25 |
| Amorphous phase (mass %) |  | 100 | 100 | 100 | 8 |
| Type of precipitated crystal |  | — | — | — | $LiMnPO_4$ |
| Discharge capacity (mAh/g) |  | 70 | 91 | 78 | 14 |
| Average discharge voltage (V) |  | 3.68 | 3.66 | 3.75 | 3.58 |
| Energy density (Wh/kg) |  | 258 | 333 | 293 | 50 |

(a) Production of Positive Electrode Active Material

Raw material batches were prepared to have compositions listed in Tables 1 and 2 using raw materials, such as sodium hydrogen phosphate ($NaH_2PO_4$), iron oxalate ($FeC_2O_4 \cdot 2H_2O$), manganese oxalate ($MnC_2O_4$), diammonium phosphate (($NH_4)_2HPO_4$), liquid phosphoric acid ($H_3PO_4$), sodium carbonate ($Na_2CO_3$), lithium metaphosphate ($LiPO_3$), and lithium carbonate ($Li_2CO_3$). Each raw material batch was melted in a nitrogen atmosphere at 900° C. for 30 minutes. The molten material was flowed onto an iron plate and rapidly quenched to obtain a melt-solidified material. The melt-solidified material was pulverized using a planetary ball mill (P7 available from Fritsch GmbH) to obtain a positive electrode active material in a powdered state. In each of Comparative Examples 1 to 3, the powder obtained as the above was burnt to be crystallized in nitrogen at 620° C. for three hours and then evaluated as a positive electrode active material.

X-ray diffraction patterns of the obtained positive electrode active materials were confirmed. Crystalline diffraction patterns were not confirmed in Examples 1 to 8. In contrast, crystalline diffraction patterns were confirmed in the positive electrode active materials of Comparative Examples 1 to 3. Data analysis was performed on the X-ray diffraction patterns using JADE Ver. 6.0 available from Materials Data Inc. to obtain the crystalline contents. Results are listed in Tables 1 and 2.

(b) Pulverizing and Mixing with Conductive Carbon

Each positive electrode active material obtained as the above and Denka Black as conductive carbon were weighed to have a ratio of 90% of the positive electrode active material versus 10% of Denka Black in terms of mass % and put into the planetary ball mill. A pulverizing and mixing process of 800 rpm in the air for 15 minutes was repeated four times to make the positive electrode active material into a composite state with the conductive carbon.

(c) Production of Alkali-Ion Secondary Battery (c-1) Production of Sodium-Ion Secondary Battery (Examples 1 to 5 and Comparative Examples 1 and 2)

Polyvinylidene fluoride was used as a binder for the composite positive electrode active material with the conductive carbon. They were weighed to have a ratio of (composite positive electrode active material):(binder)=95:5 (mass ratio), dispersed in N-methylpyrrolidone, and thereafter sufficiently stirred using a planetary centrifugal mixer to obtain a slurry.

Then, aluminum foil as a positive electrode collector having a thickness of 20 μm was coated with the obtained slurry using a doctor blade with a gap of 50 μm and the slurry was dried at 70° C. using a drier. Thereafter, they were passed through a pair of rotating rollers to be pressed with 1 t/cm$^2$ and an electrode sheet was obtained. The electrode sheet was punched out to have a diameter of 11 mm using a punch and dried at 160° C. for six hours and a circular working electrode was obtained.

Then, each test battery was produced through placing the obtained working electrode on the lower lid of a coin cell with the aluminum foil surface directing downward and laminating thereon a glass filter dried at 200° C. for eight hours, a polypropylene porous membrane (Celgard #2400 available from Hoechst Celanese) having a diameter of 16 mm dried under reduced pressure at 60° C. for eight hours, and metal sodium as the counter electrode. The electrolyte used was 1M $NaPF_6$ solution/EC:DEC=1:1 (EC=ethylene carbonate, DEC=diethyl carbonate, volume ratio). Assembly of the test battery was performed under an argon atmosphere with a dew point temperature of −70° C. or lower and an oxygen concentration of less than 0.2 ppm.

(c-2) Production of Lithium-Ion Secondary Battery (Examples 6 to 8 and Comparative Example 3)

Each test battery was produced in the same manner as that for the above sodium-ion secondary battery except that metal lithium was used as the counter electrode and 1M $LiPF_6$ solution/EC:DEC=1:1 (volume ratio) was used as the electrolyte.

(d) Charge/Discharge Test

The charge/discharge test for the sodium-ion secondary batteries was performed as follows. Constant current (CC) charge (extraction of sodium-ion from positive electrode active material) was performed at 30° C. from an open-circuit voltage (OCV) to 4.3 V. Then, CC discharge (insertion of sodium-ion into positive electrode active material) was performed from 4.3 V to 1.5 V. The C rate during the charge and discharge was 0.1 C. From the obtained charge/discharge curve, the discharge capacity (quantity of electricity discharged from unit mass of positive electrode active material) and average discharge voltage in the initial charge/discharge cycle and the energy density represented by their product were obtained. Results are listed in Table 1.

As listed in Table 1, the positive electrode active materials of Examples 1 to 5 each have a high discharge capacity of 90 mAh/g or more and a high energy density of 258 Wh/kg or more. In contrast, the positive electrode active materials of Comparative Examples 1 and 2 each have a low discharge capacity of 89 mAh/g or less and a low energy density of 250 Wh/kg or less.

The charge/discharge test for the lithium-ion secondary batteries was performed as follows. CC charge (extraction of lithium-ion from positive electrode active material) was performed at 30° C. from an open-circuit voltage (OCV) to 4.8 V. Then, CC discharge (insertion of lithium-ion into positive electrode active material) was performed from 4.8 V to 2.0 V. The C rate during the charge and discharge was 0.1 C. From the obtained charge/discharge curve, the discharge capacity and average discharge voltage in the initial charge/discharge cycle and the energy density were obtained. Results are listed in Table 2.

As listed in Table 2, the positive electrode active materials of Examples 6 to 8 each have a high discharge capacity of 70 mAh/g or more and a high energy density of 258 Wh/kg or more. In contrast, the positive electrode active material of Comparative Example 3 has a low discharge capacity of 14 mAh/g and a low energy density of 50 Wh/kg.

INDUSTRIAL APPLICABILITY

The positive electrode active material for alkali-ion secondary batteries of the present invention is suitable as an electrode material for alkali-ion secondary batteries, such as used for electric vehicles, electric tools, and emergency electric power sources for backup.

The invention claimed is:

1. A positive electrode active material for alkali-ion secondary batteries, comprising: 20-55% of $Na_2O$; 10-60% of MnO; and 20-55% of $P_2O_5+SiO_2+B_2O_3$ in terms of oxide-equivalent mol %, wherein the positive electrode active material comprises 50 mass % or more of an amorphous phase.

2. The positive electrode active material for alkali-ion secondary batteries according to claim 1, comprising: 20-55% of $Na_2O$; 10-60% of MnO; and 20-55% of $P_2O_5$ in terms of oxide-equivalent mol %.

* * * * *